Feb. 10, 1925.
J. T. PEARSON ET AL
1,525,689
COVER FOR ELECTRIC CONDUIT OUTLET BOXES
Filed April 17, 1922
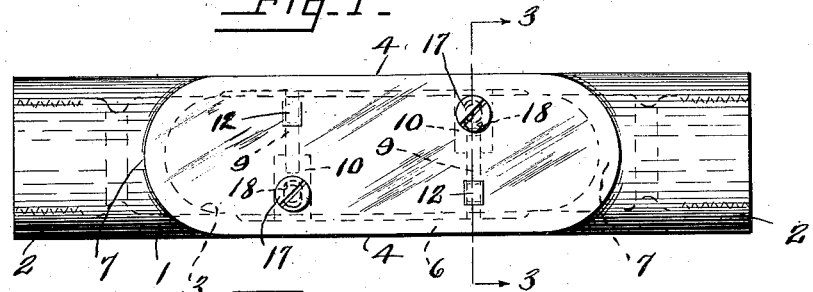
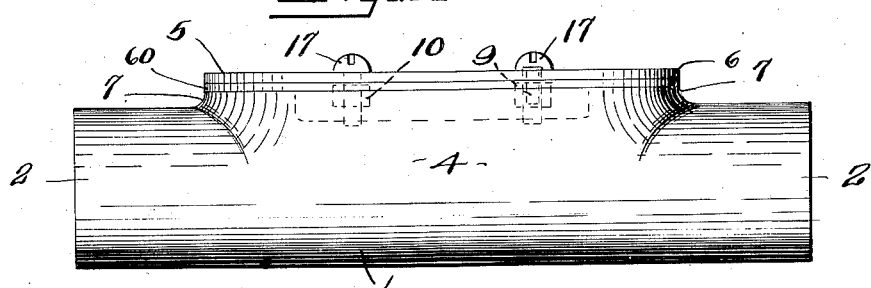
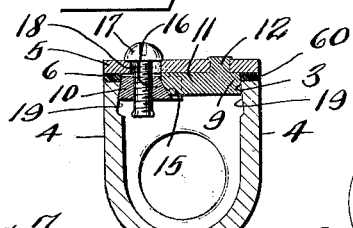
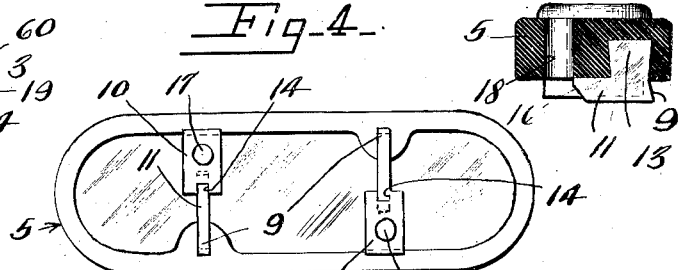
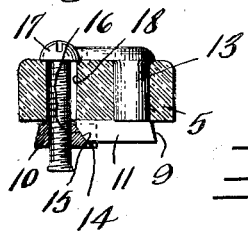
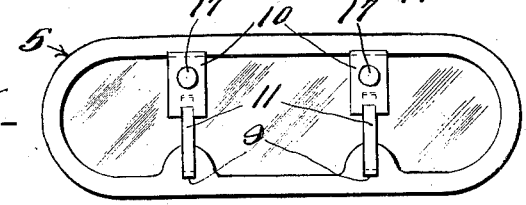
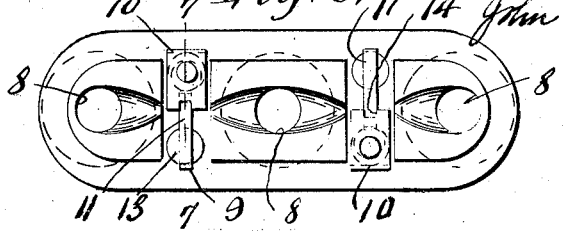

Patented Feb. 10, 1925.

1,525,689

UNITED STATES PATENT OFFICE.

JOHN T. PEARSON AND RAYMOND H. OLLEY, OF SYRACUSE, NEW YORK, ASSIGNORS TO CROUSE-HINDS COMPANY, OF SYRACUSE, NEW YORK, A CORPORATION OF NEW YORK.

COVER FOR ELECTRIC-CONDUIT OUTLET BOXES.

Application filed April 17, 1922. Serial No. 553,788.

*To all whom it may concern:*

Be it known that we, JOHN T. PEARSON and RAYMOND H. OLLEY, citizens of the United States, and residents of Syracuse, in the county of Onondaga and State of New York, have invented a certain new and useful Cover for Electric-Conduit Outlet Boxes, of which the following is a specification.

This invention relates to covers for electric conduit outlet boxes, and has for its object, a particularly simple, efficient and compact means for attaching the covers to such boxes, which means is carried by and is self-contained or unitary with the cover and requires no lugs or projections on the boxes whereby the space within the box and the open side of the box is free of obstructions interfering with the manipulation and passage of the wires in the box.

The invention consists in the novel features and in the combinations and constructions hereinafter set forth and claimed.

In describing this invention, reference is had to the accompanying drawings in which like characters designate corresponding parts in all the views.

Figures 1 and 2 are respectively a plan and a side elevation, of a cover for the conduit outlet box, which cover is provided with one form of our attaching means, the cover being shown as applied to a conduit outlet box.

Figure 3 is a sectional view on line 3—3, Fig. 1.

Figure 4 is an inverted plan view of the cover and locking means, the gasket which in some instances is used between the cover and the box being also shown.

Figure 5 is a view similar to Fig. 4 of another arrangement of this attaching means.

Figure 6 is an inverted plan of a cover formed of insulating material as composition or porcelain provided with our attaching means.

Figure 7 is a sectional view on line 7—7, Fig. 6.

Figure 8 is a fragmentary sectional view of a cover showing another way in which the attaching means is secured to the cover.

1 designates one form of conduit outlet box, which is shallow and elongated in general form and has one or more threaded nipples 2 for connection in an electric conduit system.

The box is also formed with an elongated opening 3 extending lengthwise thereof in one side and usually this opening 3 is coextensive with one side of the box, the width of the opening being the same as the distance between the opposing substantially flat parallel sides 4 of the box.

The space between the flat sides 4 is necessarily confined and hence manipulation of the wires in the box is at best, none too easy. It is difficult with the more skilled workman and is extremely difficult with the average workman when there are projections on the interior of the box, especially at the opening 3. Heretofore, conduit outlet boxes have been provided with projections or lugs extending inwardly from the opposite walls as 4, these lugs having screw threaded openings for receiving the screws associated with the covers.

The covers have heretofore been attached to the boxes by screws extending through the side margins of the cover and threading into lugs or bosses projecting into the openings 3. These lugs or bosses form obstructions on the inner faces of the walls of the box near the open side of the box.

Also, such covers have been attached to the boxes by screws located at the ends of the covers.

Such location of the screws is unsatisfactory as the intermediate part of the cover is liable to be insecure and not held snugly against the box, a condition which is prohibitive, especially when the boxes are exposed to the weather or to moisture.

This invention comprises attaching means or mechanism carried wholly by the cover for attaching the cover to conduit outlet boxes, or a cover having self-contained attaching means carried thereby arranged to be offset from the line of the conduit opening of the box and out of the path of the wires passing into the box, such attaching means being operable from the outside of the cover whereby the cover can be attached to boxes having no obstructions on the inside or outside of the box and all the space confined between the two long sides of the box is available for the manipulation of and unobstructed passage of the wires and the making of electric connections and joints.

5 designates the cover for the open side 3 of the box, such cover having its margin resting on the edges 6 of the side walls 4 and the end walls 7, or on a gasket 60 interposed between the margin of the cover and the edges 6.

The cover may be a metal plate or may be formed of insulating material and may, if desired, be provided with one or more openings as 8 for the outlet of wires.

The attaching means or mechanism is carried on the inner face of the cover and comprises means arranged to engage the inner faces of the opposing walls 4 around the opening 3 adjacent the outer edges 6 of the wall 4, a part or parts of which means are shiftable laterally to snugly bind said means to said opposing walls, and means operable from the outer face of the cover to shift said part or parts into and out of engagement with said wall.

This attaching means preferably engages the inner faces of the opposing walls 4 of the box at spaced apart points along each wall and comprises members or shoulders 9 fixed to the cover and arranged to project into the opening 3 of the box in position to thrust against the margins of the wall or walls 4 at the open side of the box, and the shiftable parts 10 located on the opposite sides of the cover from that on which the shoulders 9 are located and in line with the shoulders. These shoulders 9 and members 10 are set in from the contiguous edges of the cover and the members 10 are moved toward and from such edges so that when the members 10 are operated or shifted outwardly the combined length in a straight line between each shoulder 9 and the outer end of the member 10 is increased and the shoulder 9 thrusts against one side wall 4 and the member 10 against the opposite side walls 4, thus binding the cover to the box.

Each shoulder 9 as here shown, is provided at the outer end of a strip 11 arranged edgewise to the inner face of the cover and fixed to the cover, each strip extending transversely of the cover and terminating at its inner end near the longitudinal center line of the cover.

As seen in Fig. 3, each strip 11 is secured to the cover by an angular arm 12 extending through a perforation in the cover and riveted or spread on the outer face of the cover. When the cover is made of composition or porcelain the strip may be imbedded in the cover and have an angular arm 13 which may extend partly through the cover, or wholly through the cover and have its outer end spread or distorted on the outer face of the cover.

The shiftable members 10 are blocks, each arranged end to end with one of the strips 11 and slidable endwise relatively thereto and being interlocked therewith to prevent displacement of said members relatively to the strips.

As here shown, the blocks are formed with grooves 14 in their faces contiguous to the strips and the inner ends of the strips extend into the grooves. Also, the bottom of each groove and the end face of each strip 11 are provided with inclined or cam faces 15, 16 which when the block is moved at an angle to the plane of the cover thrusts or wedges the block outwardly against the inner face of the side wall 4.

The operating means for shifting the members or blocks 10 operates to draw the blocks toward and from the inner face of the cover and slide the inclined or cam faces 15, 16 one on the other, inclined plane fashion and hence wedge or thrust the block outwardly.

The operating means is here illustrated as screws 17 extending through the cover from the outer side and threading into the blocks 10. Hence, the blocks are nuts. The holes in the cover for these screws are preferably slots 18 or openings large enough to permit the screws to move rectilinearly with the block or nut 10 and thus avoid tilting of the screw and the block. The heads of the screws are large enough to cover the slots in all positions of the screw and the block.

If desired, each shoulder 9 and the outer end of each block or nut 10 may be bevelled and the inner faces of the margins of the walls 4 under bevelled as at 19 so that when the screws are tightened the shoulder and the block are interlocked with said wall and not merely frictionally engaged therewith. The coacting inclined or cam faces 15 and 16 on the nut and the strip 11 extend farther from the axis of the nut or screw coacting with the nut and are of greater inclination than the inclined face of the nut coacting with the bevelled face 19 of the box, so that the nut lies close to the main part of the cover out of the path of the wires and out of line with the conduit and on the tightening of the screw, is thrust laterally comparatively quickly, and also so that the cover is drawn into tight engagement with the body when the nut or locking means is extended laterally.

As seen in Fig. 4, each strip 11 and its companion block 10 is oppositely arranged with respect to the other strip and block or as seen in Fig. 5 they may be similarly arranged so that both shoulders 9 engage one and the same side 4 of the box and both blocks or nuts 10 engage the other side.

In use, when the cover is removed, the opening 3 of the box is unobstructed by lugs or projections, and after the wires have been manipulated and electric connections and joints made, the cover is placed on the box when the screws loosened so that the blocks or nuts can assume their inward or retracted position.

The screws are then tightened and owing to the inclined plane or cam faces of the nut and the strip, the cover during the turning of the screw thrusts laterally in one direction causing the shoulder 9 to bind on one side of the box and the nut to be thrust outwardly in the other direction and bind on the opposite side of the box.

Owing to the arrangement of the attaching means to engage the inner sides of the box at a plurality of points spaced apart, the longated cover is securely held in position, and owing to the arrangement of the strips and the nuts coacting therewith and the large hole for the screw, the cover itself is relieved of the holding and thrusting or lateral strain.

What we claim is:

1. In an electric conduit fitting for permitting access to, and the outlet of, electric wires, the combination with a main body including means for the passage of the wires and having in one of its sides an elongated opening for permitting access to the wires, the body being provided with opposing walls confining the long sides of the opening, said walls having inner inclined surfaces converging toward the exterior of the body; of a cover for the opening comprising parts permanently secured together, some of the parts being movable relatively to each other, the component parts of the cover being removable and securable as a whole relatively to the main body, said cover including a main part overlapping the edges of the walls confining the opening for closing the opening, and securing means comprising two inclined faces rigid with the main part of the cover, one inclined face engaging an inner inclined surface of the body in close proximity to the main part of the cover, a screw carried by the main part of the cover and having movement transversely thereof, and a nut in close proximity to the main part of the cover movable lengthwise of the screw and having opposite inclined surfaces converging toward the outer end of the screw, one inclined surface of the nut engaging the other inclined face rigid with the main part of the cover and the other inclined surface of the nut engaging an inner inclined surface of the opposite wall of the main body, said securing means including cooperating means on the nut and the portion rigid with the main part of the cover for holding said nut from turning movement on the screw, substantially as and for the purpose described.

2. In an electric conduit fitting for permitting access to, and the outlet of, electric wires, the combination with a main body including means for the passage of the wires and having in one of its sides an elongated opening for permitting access to the wires, the body being provided with opposing walls confining the long sides of the opening, said walls having inner inclined surfaces converging toward the exterior of the body; of a cover for the opening comprising a main part overlapping the edges of the walls confining the opening for closing the opening, and securing means including two inclined faces rigid with the main part of the cover, one inclined face engaging an inner inclined surface of the body close to the main part of the cover, a screw carried by the main part of the cover and having movement transversely thereof, and a nut close to the main part of the cover movable lengthwise of the screw and having opposite inclined surfaces converging toward the outer end of the screw, the inclined surface of the nut nearest the centre of the fitting being disposed at a greater angle relatively to the screw than the opposite inclined surface of the nut and being engaged with the other inclined face rigid with the main part of the cover, and said opposite inclined surface of the nut engaging an inner inclined surface of the opposite wall of the main body, said securing means including cooperating means on the nut and the portion rigid with the main part of the cover for holding said nut from turning movement on the screw, substantially as and for the purpose specified.

3. In an electric conduit fitting for permitting access to, and the outlet of, electric wires, the combination with a main body including means for the passage of the wires and having in one of its sides an elongated opening for permitting access to the wires, the body being provided with opposing walls confining the long sides of the opening, said walls having inner inclined surfaces converging toward the exterior of the body; of a cover for the opening comprising a main part overlapping the edges of the walls confining the opening for closing the opening, and securing means including two inclined faces rigid with the main part of the cover, one inclined face engaging an inner inclined surface of the body close to the main part of the cover, a screw carried by the main part of the cover and having movement transversely thereof, and a nut close to the main part of the cover movable lengthwise of the screw and having opposite inclined surfaces converging toward the outer end of the screw, one inclined surface of the nut engaging the other inclined face of the main part of the cover and the other inclined surface of the nut engaging an inner inclined surface of the opposite wall of the main body, the portion of the nut nearest the centre of the fitting extending from the lengthwise axis of the screw a greater distance than the opposite portion of the nut, said securing means including cooperating means on said portion rigid with the main part of the cover and on the inner extremity of the portion of the nut of greatest projection from the center of the screw for holding the nut from turning movement on the screw, substantially as and for the purpose set forth.

4. In an electric conduit fitting for permitting access to, and the outlet of, electric wires, the combination with a main body including means for the passage of the wires and having in one of its sides an elongated opening for permitting access to the wires, the body being provided with opposing walls confining the long sides of the opening, said walls having spaced apart pairs of inner inclined surfaces converging toward the exterior of the body; of a cover for the opening comprising parts non-detachably secured together, some of the parts being movable relatively to each other, the component parts of the cover being removable and securable as a whole relatively to the main body, the cover including a main part provided with transverse slots spaced apart lengthwise thereof, said main part overlapping the edges of the walls confining the opening for closing the opening, a pair of securing means spaced apart lengthwise of the cover, each of said securing means comprising two inclined faces rigid with the main part of the cover, one inclined face engaging an inner inclined surface of the body close to the main part of the cover, a screw carried by the main part of the cover and passed through the companion transverse slot in the main part of the cover and having movement transversely of the cover, and a nut close to the main part of the cover movable lengthwise of the screw and having opposite inclined surfaces converging toward the outer end of the screw, one inclined surface of the nut engaging the other companion inclined face rigid with the main part of the cover and the other inclined surface of the nut engaging an inner inclined surface of the opposite wall of the main body, said securing means including cooperating means on the nut and the portion rigid with the main part of the cover for holding said nut from turning movement on the screw, substantially as and for the purpose described.

5. In an electric conduit fitting for permitting access to, and the outlet of, electric wires, the combination with a main body including means for the passage of the wires and having in one of its sides an elongated opening for permitting access to the wires, the body being provided with opposing walls confining the long sides of the opening, said walls having spaced apart pairs of inner inclined surfaces converging toward the exterior of the body; of a cover for the opening comprising parts non-detachably secured together, some of the parts being movable relatively to each other, the component parts of the cover being removable and securable as a whole relatively to the main body, the cover including a main part provided with transverse slots spaced apart lengthwise thereof, said main part overlapping the edges of the walls confining the opening for closing the opening, a pair of securing means spaced apart lengthwise of the cover, each of said securing means comprising two inclined faces rigid with the main part of the cover, one inclined face engaging a companion inner inclined surface of the body close to the main part of the cover, a screw carried by the main part of the cover and passed through the companion transverse slot in the main part of the cover and having movement transversely of the cover, and a nut close to the main part of the cover movable lengthwise of the screw and having opposite inclined surfaces converging toward the outer end of the screw, one inclined surface of the nut engaging the other companion inclined face rigid with the main part of the cover and the other inclined surface of the nut engaging a companion inner inclined surface of the opposite wall of the main body, the portion of the nut nearest the centre of the fitting extending from the lengthwise axis of the screw a greater distance than the opposite portion of the nut, said securing means including cooperating means on said portion rigid with the main part of the cover and on the inner extremity of the portion of the nut of greatest projection from the center of the screw for holding the nut from turning movement on the screw substantially as and for the purpose specified.

6. An electric conduit outlet box comprising a shallow elongated body open at one side for permitting free access to electric wires, the side walls of the body presenting unobstructed inner faces to permit the manipulation of the electric wires without injury to the operator, a cover engaging the outer edges of the walls to close the opening, and locking means arranged on the inner face of the cover and extensible laterally to grip the opposite walls interiorly in locking contact including operating means exterior of the cover, said locking means being offset from the line of the conduit and out of the path of wires drawn through the conduit to prevent contact with and injury to the wires.

7. An electric conduit outlet box comprising a shallow elongated body open at one side for permitting free access to electric wires, the side walls of the body presenting unobstructed inner faces to permit the manipulation of the electric wires without injury to the operator, a cover engaging the outer edges of the walls to close the opening, and locking means arranged on the inner face of the cover and extensible laterally to grip the opposite walls interiorly in locking contact, including operating means exterior of the cover, said locking means and the body having cooperating portions arranged to draw the cover in tight engagement with the body when the locking means is extended and the said locking means being located wholly outside of the line of the conduit and out of the path of the wires to prevent contact of the wires with the locking means and injury to the wires.

In testimony whereof, we have hereunto signed our names, at Syracuse, in the county of Onondaga, and State of New York, this 29th day of March, 1922.

JOHN T. PEARSON.
RAYMOND H. OLLEY.